United States Patent
Cambra Ibañez et al.

(10) Patent No.: US 8,075,870 B2
(45) Date of Patent: Dec. 13, 2011

(54) PROCESS FOR OBTAINING HYDROGEN FROM NATURAL GAS

(75) Inventors: José Francisco Cambra Ibañez, Vizcaya (ES); Pedro Luis Arias Ergueta, Vizcaya (ES); María Belén Güemez Bilbao, Vizcaya (ES); Victoria Laura Barrio Cagigal, Vizcaya (ES)

(73) Assignee: Universidad Del Pais Vasco Euskal Herriko Unibertsitatea, Vizcaya (ES)

( * ) Notice: Subject to any disclaimer, the term of this patent is extended or adjusted under 35 U.S.C. 154(b) by 691 days.

(21) Appl. No.: 11/993,889

(22) PCT Filed: Jun. 20, 2006

(86) PCT No.: PCT/ES2006/000362
§ 371 (c)(1),
(2), (4) Date: Apr. 2, 2008

(87) PCT Pub. No.: WO2006/136632
PCT Pub. Date: Dec. 28, 2006

(65) Prior Publication Data
US 2008/0315158 A1 Dec. 25, 2008

(30) Foreign Application Priority Data
Jun. 24, 2005 (ES) .................................. 200501548

(51) Int. Cl.
 C01B 3/24 (2006.01)
 C01B 3/38 (2006.01)
(52) U.S. Cl. ........................................ 423/650; 252/373
(58) Field of Classification Search .................. 423/650
 See application file for complete search history.

(56) References Cited

U.S. PATENT DOCUMENTS

| 6,713,040 B2 | 3/2004 | Ahmed et al. |
| 2002/0007595 A1 | 1/2002 | Maier-Roeltgen et al. |
| 2003/0188475 A1 | 10/2003 | Ahmed et al. |

(Continued)

FOREIGN PATENT DOCUMENTS

DE 102 39 111 3/2004

(Continued)

OTHER PUBLICATIONS

Andrew E. Lutz, et al."Thermodynamic analysis of hydrogen production by steam reforming", International Journal of Hydrogen Energy, 2003, pp. 159-167, vol. 28, Elsevier Science Ltd., US.

(Continued)

*Primary Examiner* — Melvin Mayes
*Assistant Examiner* — Kenneth Vaden
(74) *Attorney, Agent, or Firm* — Katten Muchin Rosenman LLP (57) ABSTRACT

The invention relates to a process for obtaining hydrogen from natural gas which comprises (a) reacting the natural gas with a mixture of air and steam in a single reactor to obtain a gas comprising $H_2$ and CO, (b) reacting the CO produced at a high temperature with steam to obtain a gas comprising $H_2$ and $CO_2$, and (c) reacting the CO which has not reacted in step (b) at a low temperature with steam to obtain a gas comprising $H_2$ and $CO_2$, characterized in that in step (a) the natural gas, the air and the steam are fed simultaneously and react on the same catalyst and in that the pressure used in steps (a) to (c) varies between 1 and 8 atm, as well as to a $H_2$ production plant for carrying out the mentioned process.

18 Claims, 2 Drawing Sheets

U.S. PATENT DOCUMENTS

2005/0066577 A1* 3/2005 Arcuri .................. 48/198.7

FOREIGN PATENT DOCUMENTS

| WO | 2004/054013 | 6/2004 |
|---|---|---|
| WO | 2005019100 | 3/2005 |

OTHER PUBLICATIONS

Andrew E. Lutz, et al."Theromodynamic analysis of hydrogen production by partial oxidation reforming", International Journal of Hydrogen Energy, 2004, pp. 809-816, vol. 29, Elsevier Science Ltd., US.

A.K. Avci, et al., "Heterogenous reactor modeling for simulation of catalytic oxidation and steam reforming of methane", Chemical Engineering Science, 2001, pp. 641-649, vol. 56, Elsevier Science Ltd., US.

S. Cavallaro, et al., "Syngas and electricity production by an integrated authothermal reforming/molten carbonate fuel cell system", Journal of Power Sources, 1998, pp. 190-196, vol. 76, Elsevier Science Ltd., US.

"C11/G-91/C14 Steam hydrocarbon reforming catalysts", Technical Bulletin, Catalysts of the SUD-CHEMIE Group, SUD CHEME, AG, Germany.

"Catalysts for steam reforming natural gas, associated gas & LPG", pp. 1-25, ICI Group, Katalco, US.

V.R. Choudhary, et al., "Oxidative conversion of methane to syngas over nickel supported on commercial low surface are porous catalyst carriers precoated with alkaline and rare earth oxides", Journal of Catalysts, 1997, vol. 172, pp. 281-293, Article No. CA971838, Academic Press, US.

Ann M. De Groote, et al., "Simuation of the catalytic partial oxidation of methane to synthesis gas", Applied Catalysis A: General, 1996, pp. 245-264, vol. 138, Elsevier Science B.V.

S. Freni, et al."Hydrogen production from methane through catalytic partial oxidation reactions", Journal of Power Sources, 2000, vol. 87, pp. 28-38, Elsevier Science S.A.

Javier Galindo, et al., "Informe sobre viabilidad tecno-economica de los actuales metodos de produccion de hidrogeno", Sep. 2000, pp. 1-56, Escuela superior de ingenieros de bilbao bilboko ingenerian goi eskola, Spain.

K.L. Hohn, et al."Parial oxidation of methane to syngas at high space velocities over Rh_coated spheres", Applied Catalysis A: General, 2001, pp. 53-68, vol. 211, Elsevier Science B.V.

J. Hord, "Is hydrogen a safe fuel ?", International Journal of Hydrogen Energy, 1978, pp. 157-177, vol. 3, Pergamon Press, US.

P.S. Maiya, et al., "Maximizing H2 production by combined partial oxidation of CH4 and water gas shift reaction", Applied Catalysis A: General, 2000, pp. 65-72, vol. 196, Elsevier Science B.V.

Duane B. Myers, et al, "Cost and performance comparison of stationary hydrogen fueling appliance" Task 2 Report, Apr. 2002, pp. 1-123, Directed Technologies, US.

Paul M. Ordin, "Safety standard for hydrogen and hydgrogen systems", Feb. 12, 1997, Office of Safey and Mission Assurance, Nasa, US.

Dr. Joan M. Ogden, "Review of small stationary reformers for hydrogen production", Report to the International Energy Agency, Mar. 9, 2001, pp. 1-64, National Renewable Energy Laboratory, US.

"Refiners crack down on sulfur", Refining and Petrochemicals, Aug. 2000, pp. 45-48, Chemical Engineering, WWW.CHE.COM.

M.A. Pena, et al., "New catalytic routes for syngas and hydrogen production", Applied Catalysis A: General, 1996, pp. 7-57, vol. 144, Elsevier Science B.V.

Stefan Rabe, et al., "Low temperature catalytic partial oxidation of methane for gas-to-liquids applications", Applied Catalysis A: General, 2005, pp. 177-188, vol. 292, Elsevier B.V.

Vincenzo Recupero, et al., "Hydrogen generator, via catalytic partial oxidation of methane for fuel cells", Journal of Power Sources, 1998, pp. 208-214, vol. 71, Elsevier Science S.A.

Eli Ruckenstein, et al., "Combination of CO2 reforming and partial oxidation of methane over NiO/MgO Solid Solution Catalysts", Ind. Eng. Chem. Res., 1998, pp. 1744-1747, vol. 37, American Chemical Society, US.

Eh Stitt, et al., "Emerging Trends in Syngas and Hydrogen", Jun. 2000, pp. 1-21, CatCon, US.

V.A. Tsipouriari, et al., "Catalytic partial oxidation of methane to synthesis gas over Ni-based catalysts, I. Catalyst peformance characteristics ", Journal of Catalysis, 1998, pp. 283-291,vol. 179, Academic Press, US.

V.A. Tsipouriari, et al., "Catalytic partial oxidation of methane to synthesis gas over Ni-based catalysts, II. Transient, FTIR, and XRD Measurements", Journal of Catalysis, 1998, pp. 292-299, vol. 179, Academic Press, US.

J. Vinas, et al., "Water-gas shift reaction at high temperature. Study of kinetics and catalyst deactivation on a Fe2O3-Cr2O3 catalyst", 1999, pp. 91-98, vol. 29, Latin American Applied Research.

Dorit Wolf, et al., "External mass and heat transfer limitations of the partial oxidation of methane over a Pt/MgO catalyst-consequences for adiabatic reactor operation", 1997, vol. 36, pp. 3345-3353, Ind. Eng. Chem, Res. American Chemical Society, US.

J. Zhu, et al., "Reforming of CH4 by partial oxidation: thermodyamic and kinetic analyses", Fuel, 2001, pp. 899-905, vol. 80, Elsevier Service Ltd., US.

Y.S. Seo, et al., "Evaluation of thermodynamically favourable operating conditions for production of hydrogen in three different reforming technologies", Journal of Power Sources, 2002, pp. 213-225, vol. 108, Elsevier Science B.V.

Tsutomu Yamaguchi, Application of ZrO2 as a catalyst and a catalyst support, 1994, pp. 199-218, vol. 20, Catalyst Today, Japan.

Pedro Luis Arias Ergueta, "La oxidacation parcial catalitica de gas natural", 1995, pp. 1-39, Babcock Fundacion Para La Innovaction Tecnologica, Spain.

"Disposciones Generals", Feb. 18, 2002, p. (6369-6377), Minesterio De Economia, Spain.

Oscar Garcia, et al., "Diseno de un sistema para la fabricacion de hidrogeno a partir de gas natural", Aug. 2000, Escuela superior de ingenieros de bilbao bilboko ingeniarien goi eskola, Spain.

Supplementary European Search Report dated Aug. 4, 2011, from corresponding European Application No. 06 79 4037.

A. Heinzel, et al. "Reforming of natural gas—hydrogen generation for small scale stationary fuel cell systems" Journal of Power Sources, vol. 105, No. 2, Mar. 20, 2002, pp. 202-207.

Thomas Giroux. et al. "Monolithic structures as alternatives to particulate catalysts for the reforming of hydrocarbons for hydrogen generation" Applied Catalysis B: Environmental, vol. 56, No. 1-2, Mar. 10, 2005, pp. 95-110.

* cited by examiner

PROCESS FOR OBTAINING HYDROGEN FROM NATURAL GAS

FIELD OF THE INVENTION

The present invention relates to a hydrogen production system using natural gas as the main feed to develop an industrial hydrogen plant that is suitable, due to its small size, as an auxiliary installation within the production system of companies with intermediate hydrogen consumption.

BACKGROUND OF THE INVENTION

The importance of hydrogen gas in the chemical industry has long been known. Hydrogen is currently obtained as a by-product in certain processes [3, 12, 14, 26]: catalytic reforming in oil refineries or electrolysis of molten sodium chloride or sodium chloride in aqueous solution. Refineries completely consume the hydrogen produced by their reforming systems to improve the octane number of gasoline, requiring enormous additional amounts of $H_2$ for their processes that eliminate contents of precursor atoms of pollutants (mainly S) in gases, gasolines and diesel oils, which forces them to have large specific hydrogen manufacturing plants. This consumption is furthermore increasing as lower sulfur contents in petroleum derivatives are being required according to the environmental legislation.

However, together with traditional markets for hydrogen: steel and metallurgical industries, glass manufacturing etc., there are emerging markets, among which that related to the transport sector, either in vehicles with internal combustion engines, burning hydrogen as a fuel, or in vehicles using it in fuel cells feeding electric engines, must be highlighted [6,18, 20]. A fundamental characteristic of these new markets is the fact that they generate a number of consumption points that are completely dispersed over the geography of any developed country. The alternative of distributing hydrogen according to the traditional method with which gasoline and gas oil are distributed (trailers) causes serious drawbacks associated to safety and cost problems. An enormously interesting alternative would be the development of technologies which allow manufacturing hydrogen in situ, provided that the consumption justifies it.

The most interesting raw material for manufacturing hydrogen for these purposes is natural gas and its main component, methane ($CH_4$) (approximately 90% by volume of natural gas), given the wide distribution network existing for this fuel and the existence of technologies for converting it into hydrogen.

The most important processes that are currently used for producing hydrogen from methane are four in number [13]: steam reforming, partial oxidation, combination of oxidation and reforming (system referred to as autothermal reforming) and catalytic decomposition.

Steam reforming consists of the catalytic transformation of methane and steam in hydrogen and carbon oxides. Several reactions may occur [11]:

1) Main reaction (reforming):

$$CH_4+H_2O \rightleftharpoons CO+3H_2 \; \Delta H°(298\,K)=206.14\,kJ/mol$$

2) Shift reaction:

$$CO+H_2O \rightleftharpoons CO_2+H_2 \; \Delta H°(298\,K)=-41.17\,kJ/mol$$

3) Carbon deposition reactions (unwanted):

$$2CO \rightleftharpoons C(s)+CO_2$$

Other reactions may occur in the process but they would depend on the three written reactions.

The reforming reaction is favored at high temperatures (760-925° C.) and low pressures. The catalysts that are most used are formed by nickel supported on alumina. The reformer is fed with excess water to prevent carbon formation. The most usual molar water/methane feed ratios are comprised between 2 and 5.

The steam reforming is the process that is most used on an industrial scale and is the most studied and known one. It is the process whereby a larger hydrogen production is obtained. In this case, heat transmission is critical because the reaction is strongly endothermic. Enormous and very complex reforming ovens are therefore needed. This complexity and the associated costs make this process be only economically viable for large productions. It must be noted, however, that ongoing developments attempt to generate more compact reforming technologies the economical viability of which can be reached for smaller productions in the mid-term future (1).

CO is produced in this process, therefore in processes in which the produced gas is used, which do not tolerate the presence of this compound, it will be necessary to place after the reformer systems reducing the CO concentration to the necessary concentration for the good operation of the process in question.

The partial oxidation process consists of the catalytic oxidation reaction of methane [32].

$$CH_4+0.5O_2 \rightleftharpoons CO+2H_2 \; \Delta H°(298\,K)=-36\,kJ/mol$$

The reaction takes place at high temperatures (T>800° C.) in excess methane. The molar $O_2/CH_4$ feed ratio is usually comprised between 0.5 and 1. The oxygen source can be air, oxygen-enriched air or pure oxygen. Multiple catalysts have been developed for this process. The most used metals are platinum and nickel supported on a ceramic material. One of the problems of this process is carbon deposition, involving a fast deactivation of the catalyst.

The hydrogen production is less than that obtained in a steam reforming process and is therefore less efficient. The main advantage of this process is its exothermicity and this leads to the need for little physical space and a fast ignition. It is furthermore insensitive to load variation and the general cost is relatively low (2).

As in the reforming process, to reduce the CO content it is necessary to place after the reactor systems eliminating it to a suitable concentration so as to be able to feed the subsequent application, if the latter requires so.

Another hydrogen production process is the so-called "Catalytic Natural Gas Decomposition". The process is essentially an endothermic reaction in which methane decomposition occurs to yield solid carbon and hydrogen [13]. The hydrogen produced increases when the temperature increases and the pressure decreases.

$$CH_4 \rightleftharpoons C(s)+2H_2 \; \Delta H°(298\,K)=75\,kJ/mol$$

Catalytic natural gas decomposition produces highly pure hydrogen which does not require any subsequent purification step. The need to work with two reactors in parallel to use the energy produced in the regeneration of the catalyst involves an increase in the reformer size. But its main drawback lies in the fact that all the carbon present in the methane ends up as soot in the catalytic bed and the regeneration of the latter requires its almost-complete combustion with air, whereby the chance to generate additional amounts of $H_2$ by the subsequent reforming of CO is lost. Furthermore, these cycles of reactivation by combustion, in which high temperatures are reached, cause accelerated deactivations of the catalysts involved.

Autothermal reforming (ATR) is a combination of catalytic and non-catalytic partial oxidation and steam reforming, such that the heat produced in the oxidation reactions is used, after the subsequent steam feed, for steam reforming, being overall an adiabatic reactor. This allows the reactor to be much more compact than in the other processes.

The hydrogen production is comprised between that obtained in steam reforming and that obtained in catalytic partial oxidation. In addition, if steam were added in the feed carbon deposition would be prevented and the high temperature peak occurring in the initial area of the catalytic bed, which is typical of methane combustion, would be reduced [4,11].

This hydrogen production system therefore has the following advantages:

Maximum methane conversion.
High yield in the hydrogen production.
Minimum energy consumption.
Minimum generation of secondary pollutants ($NO_x$)
Compact size.
Low fixed and variable costs
Quick start and response to load variations.
Quick operation and maintenance.

From that set forth, it is deduced that partial oxidation and autothermal reforming processes are the most suitable processes, the latter being chosen to achieve this project.

This type of reactors currently consists of an area in which oxidation occurs and another area in which steam reforming occurs [32], using different catalysts in each area of the reactor (in some processes the partial oxidation step is carried out by means of a non-catalytic process). In these reactors, the combustion with oxygen shortage occurs first, to subsequently inject steam in an amount and at a pressure and temperature that are suitable for, in adiabatic conditions, the reforming reactions of the methane that has not reacted, and mainly of the carbon monoxide produced, to occur.

The type of reactor usually used in industrial processes [12, 26] is the fixed bed reactor due to the compactness, due to the simplicity in its design and low cost.

Most industrial processes (large scale plants) operate at pressures above 25 atm, which makes the installations more compact for the feed flows which are used.

In large scale industrial plants, the operation is carried out at very high temperatures, above 1200° C., so as to obtain high conversions since very high pressures are used in the operation. These so severe operating conditions require special materials which are very expensive.

There are two large groups of catalysts used to obtain synthesis gas: Ni-based catalysts and noble metal-based catalysts.

Ni-based catalysts supported on Mg—$Al_2O_3$ are generally used in industrial steam reforming processes and are the most extensively studied. However, they are also used in partial oxidation and autothermal reforming processes [10], although they are not specific for these processes. Said catalysts have a very high turnover number (number of molecules reacting per active site per second), high heat stability and low cost, in addition to a good behavior in wide temperature intervals (450-900° C.) and, above 700° C., they have CO selectivities close to 95% and conversions close to 100%. However, their main drawback is that they have a fast deactivation due to carbon deposition on the surface of the catalyst particles.

Several studies of Ni catalysts supported on $La_2O_3$, MgO or $ZrO_2$ having advantages in partial oxidation processes have been found in the literature [10, 25, 28, 31].

Noble metal-based catalysts seem to be more active in partial oxidation and autothermal reforming reactions than nickel-based catalysts, but are about 150 times more expensive (3). Ru is the least expensive among the noble metals and is more stable than nickel. At low concentrations on an $Al_2O_3$ support, it is more active and selective than Ni. If $SiO_2$ is used as the support, Ru can oxidize methane at temperatures of 400° C. [12].

The choice of the support and the conditions for preparing the catalysts are essential in the behavior in the conversion, selectivity and useful life of the catalyst and, in this sense, efforts are being made in the search for new catalysts.

Avci et al. [4] studied the autothermal reforming reactions in a reactor containing a mixture of Ni—$Al_2O_3$ and Pt—$Al_2O_3$ catalysts, observing that the hydrogen production is greater than when each catalyst is located in two different beds of the reactor and when the $O_2/CH_4$ and $H_2O/CH_4$ ratios are increased.

The latest studies in this field intend that this process does not occur in two steps (initial combustion with oxygen shortage and subsequent reforming with steam injected in this second step to generate additional hydrogen, using the energy contained in the high temperature gases generated in the incomplete initial combustion) but rather in a single catalytic step to which natural gas, air (or oxygen) and steam would be fed, which would generate a much more compact reaction system (23).

To cover these needs and overcome the drawbacks of the prior art, the authors have carried out a new system in which natural gas, oxygen and steam are fed simultaneously and react on the same catalyst, such that the partial oxidation and steam reforming reactions occurs almost simultaneously, giving rise to a wet catalytic partial oxidation, wet CPO, which allows developing a hydrogen obtaining system for production levels that are much lower than the usual ones in current conventional reforming plants, "in situ" and economically competitive with its distribution from centralized plants.

OBJECT OF THE INVENTION

The main aspect of the present invention provides a process for obtaining hydrogen from natural gas which comprises (a) reacting the natural gas with a mixture of air and steam in a single reactor to obtain a gas comprising, as useful components, hydrogen and carbon monoxide, (b) reacting the carbon monoxide produced in step (a) at a high temperature with steam to obtain a gas comprising hydrogen and carbon dioxide, and (c) reacting the monoxide that has not reacted in step (b) at a low temperature with steam to obtain a gas comprising hydrogen and carbon dioxide, characterized in that in step (a) the natural gas, the air and the steam are fed simultaneously and react on the same catalyst and in that the pressure used in steps (a) to (c) varies between 1 and 8 atm.

Another aspect of the invention relates to a hydrogen production plant for carrying out the mentioned process comprising (a) a first adiabatic fixed bed reactor in which the natural gas is reacted with a mixture of air and steam to obtain a gas comprising hydrogen and carbon monoxide, (b) a sec- ond adiabatic fixed bed reactor in which the carbon monoxide produced in the first reactor is reacted at a high temperature with steam to obtain a gas comprising hydrogen and carbon dioxide, and (c) a third adiabatic fixed bed reactor in which the monoxide which has not reacted in the second reactor is reacted at a low temperature with steam to obtain a gas comprising hydrogen and carbon dioxide.

DESCRIPTION OF THE INVENTION

The main aspect of the present invention provides a process for obtaining hydrogen from natural gas comprising the steps:
(a) reacting the natural gas with a mixture of atmospheric air and steam in a single reactor to obtain a gas comprising hydrogen and carbon monoxide
(b) reacting the carbon monoxide produced in step (a) at a high temperature with steam to obtain a gas comprising hydrogen and carbon dioxide, and
(c) reacting the monoxide which has not reacted in step (b) at a low temperature with steam to obtain a gas comprising hydrogen and carbon dioxide.
Characterized in that in step (a) the natural gas, the air and the steam are fed simultaneously and react on the same catalyst and in that the pressure used in steps (a) to (c) varies between 1 and 8 atm.

In a particular embodiment of the invention, the pressure used in steps (a)-(c) is 4 atm, since it has been observed that it favors the shift of the equilibrium towards the products, which is beneficial for the objective of this invention. In addition, it has been observed that working at a pressure that is slightly higher than atmospheric pressure involves a more compact system. Furthermore, not having to compress all the gas streams used in the process considerably reduces the energy consumption of the installation.

Step a) consists of a combination of the partial oxidation of methane with steam reforming. The following chemical reactions occur:

Partial oxidation: $CH_4 + 0.5O_2 = CO + 2H_2$ $CO + 0.5O_2 = CO_2$

Steam reforming: $CH4 + H_2O = CO + 3H_2$

In these conditions, these reactions occur almost simultaneously, giving rise to a wet catalytic partial oxidation (wet CPO).

A catalyst of nickel supported on magnesia developed by the authors will be used in this new adiabatic wet catalytic natural gas reforming process in a single step.

Steps b) and c), are CO shift reactions, a reaction known as WGSR (water gas shift reaction) or simply SHIFT reaction, which allow increasing the hydrogen production, reducing the CO content produced in the Wet CPO.

The oxidation reaction is exothermic such that the heat produced is used for steam reforming, being overall an adiabatic reactor. In the same way, heat is also released in shift reactions.

Thus, in a particular embodiment of the invention, the excess heat from step (a) is used to preheat the entire feed to the reactor and the excess heat from steps (b) and (c) is used to produce the steam used.

Both the natural gas and the water used in this process are thus directly fed from the supply network, whereas the steam is generated in the process itself, including if necessary an external power supply source to meet the energy requirements.

The main component of natural gas is methane (approximately 90% by volume). Methane as a raw material has the following advantages compared to other hydrocarbons:
It is easily accessible, due to the fact that a natural gas supply network is currently available.
Its low price compared to that of other hydrocarbons the use of which would also be feasible for the purposes of this invention.
Its H/C ratio is the maximum one existing among hydrocarbons, therefore the use of methane will provide a larger hydrogen production for the same amount of raw material consumed, in addition to producing a lower proportion of CO and $CO_2$ per unit of $H_2$ produced.

A very important aspect of the composition of natural gas is the sulfur content. When natural gas leaves the reservoir, it has a small percentage of hydrogen sulfide ($H_2S$). This sulfur compound is removed from natural gas before introducing it in the supply network.

In these conditions, the sulfur content of the natural gas circulating through the supply network is less than the detection limit of the chromatographic method used to analyze its composition, therefore the composition data do not show any percentage.

This piece of data is very important given that sulfur is a strong poison of many catalysts. If the amount of sulfur in the feed to the system was substantial, a system for desulfurizing the natural gas stream should be placed before the catalytic partial oxidation reactor, which would make the system considerably more expensive. Since the amount is unsubstantial (it is usually associated to odorizing molecules that are added so that natural gas leaks can be detected), only one cartridge retaining the sulfur compounds will be placed, to prevent the accumulation of these small amounts in the catalysts from causing their deactivation over time.

Natural gas is mixed with atmospheric air for the loading into the partial oxidation reactor. An amount of steam which is suitable for improving the yield of the oxidation reaction with the partial steam reforming and for having steam for the low and high temperature shift reactions is injected into the load.

In a particular embodiment of the invention, the process is carried out with an $O_2/CH_4$ feed ratio varying between 0.4 and 0.7 and a $H_2O/CH_4$ feed ratio varying between 0.8 and 2.5.

It has been seen that as the $O_2/CH_4$ ratio increases, for the same $H_2O/CH_4$ ratio, the $H_2$ production per mole fed decreases. Thus, in preferred embodiments of the invention, the process for obtaining hydrogen from natural gas is carried out with an $O_2/CH_4$ feed ratio of 0.5.

In another preferred embodiment of the invention, this process for obtaining hydrogen from natural gas is carried out with a $H_2O/CH_4$ feed ratio=2, to meet the requirements of the autothermal reactor and of the shift reactions because on one hand, it prevents having to introduce much water flow and investing in energy consumption to be able to vaporize it, whereby the process becomes less expensive, and on the other hand, it favors $H_2$ production.

In the present invention, the $H_2O/CO$ ratio is determined by the products of the autothermal reactor. At a given temperature, an increase of the $H_2O/CO$ ratio involves an increase of CO conversion. Nevertheless, the increase of the conversion is not very important as the value $H_2O/CO=2$ is exceeded, therefore the improvement in $H_2$ production is not very significant from said value of the reaction.

In a particular embodiment of the invention, step (a) of the process for obtaining hydrogen from natural gas is carried out at a temperature varying between 500 and 1000° C., preferably at 800° C., which is reached at the outlet of the reactor, which allows obtaining methane conversions in the equilibrium that are greater than 85%. This temperature further allows working with more cost-effective materials making the installation less expensive.

Although space velocity, defined as the ratio between the volumetric gas flow fed in normal conditions and the catalytic bed volume (GSHV), is not the inverse of the reaction time, it does have an inverse relationship with it, such that high space velocities involve low residence times. It also facilitates good mixing and minimizes mass transfer effects.

In particular embodiments of the invention, the 70,000 and 90,000 h-1 range, preferably 80,000 h-1, has been considered the space velocity (GHSV) range, which allows reaching a high CO and $H_2$ selectivity in the catalytic partial oxidation of methane.

In addition, the optimization of shift reactions b) and c) depends on different factors, the most important of which are the space velocity, the operating temperature and the $H_2O/CO$ feed ratio. The type of catalyst to be used must obviously also be taken into account, which will affect the previous factors in a decisive manner.

The pressure does not affect the shift reaction as there is no variation in the number of moles, therefore the same pressure as in reaction a) has been chosen.

Figure 1:
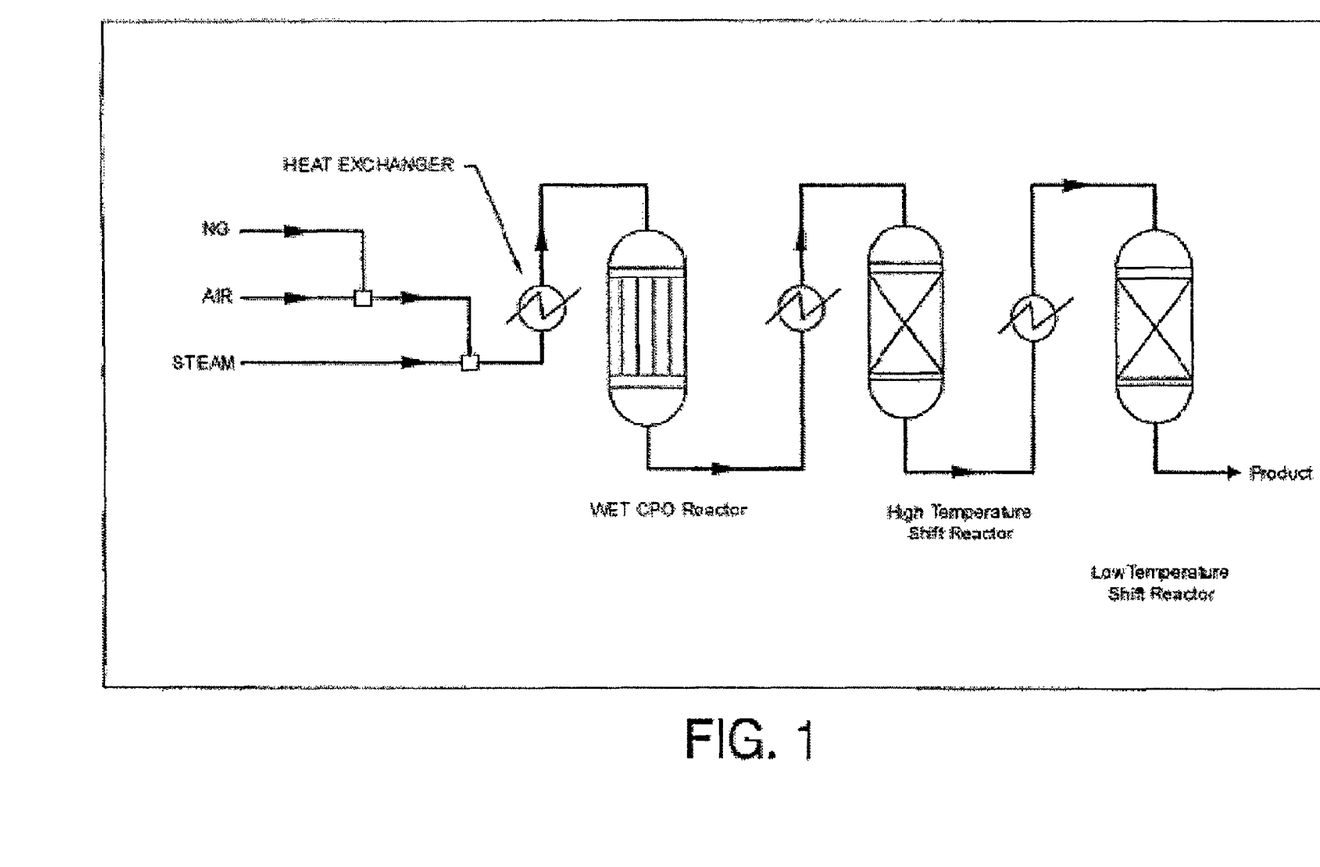
FIG. 1 shows a basic flowchart of hydrogen production from natural gas by means of wet catalytic partial oxidation, wet CPO.
Figure 2:
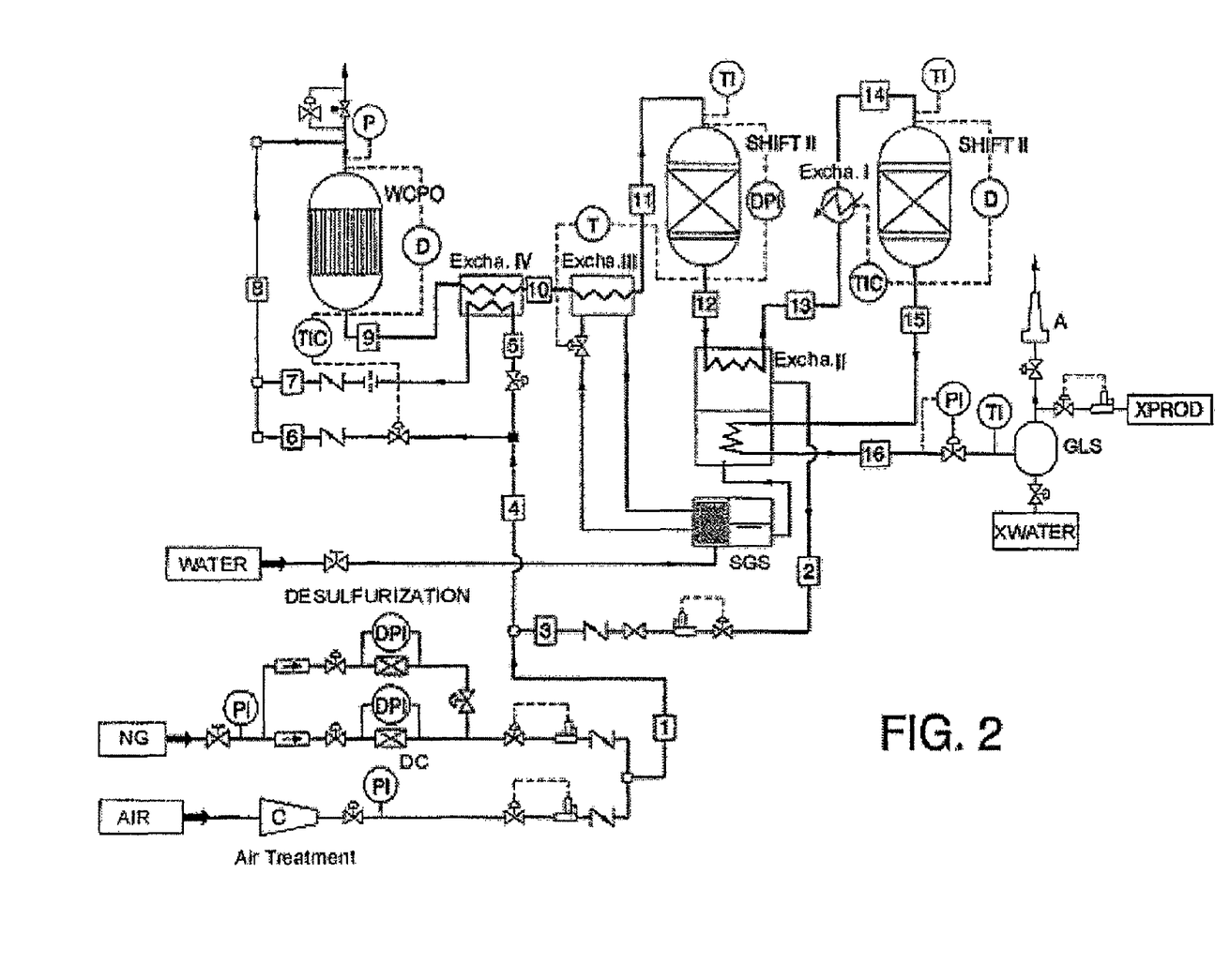
FIG. 2 shows a hydrogen production plant to produce hydrogen from natural gas by means of wet catalytic partial oxidation, wet CPO.

To maximize the conversion of reactions b) and c) and reach values close to equilibrium, one particular embodiment of the invention contemplates the use of two separate reactors with an intermediate cooling (FIG. 2, EXCHANGER II) of the gas stream located between both reactors (FIG. 2, streams 12 and 13). The reactors have two different types of catalysts and operate at also different temperatures (high and low temperature shift reactors, respectively). The fact of having a catalytic bed which allows operating at a lower temperature makes the conversion of CO into $CO_2$ increase significantly. In both reactors, the residence times will be of the order of tens of milliseconds.

In the high temperature SHIFT reactor (SHIFT I), the catalytic bed used is generally a catalyst of iron oxide ($Fe_2O_3$) and chromium oxide ($Cr_2O_3$), with small amounts of other oxides such as CuO and volatile compounds [29]. This type of catalyst is relatively inexpensive and resistant to sulfur and chlorine compound impurities, but it cannot carry out the shift reaction at the low temperatures necessary for reaching a high equilibrium conversion of CO into $CO_2$.

In a preferred embodiment of the invention, the high temperature shift reaction is carried out at a temperature varying between 350-450° C., preferably being carried out at 400° C. In these conditions, the chosen space velocity varies between 7,000-9,000 h-1, the value of 8000 $h^{-1}$ being preferred.

In the low temperature SHIFT reactor (SHIFT II), the reaction that occurs is the same as that in the high temperature reactor, but the difference is that since the type of catalyst has different characteristics, the temperature can be further reduced and the reaction equilibrium can thus be shifted towards hydrogen production.

The catalyst for the low temperature conversion reaction is supplied in its oxidized form and its major component is CuO, generally mixed with ZnO. Other components of the catalyst can be $Fe_2O_3$ and $Cr_2O_3$ as stabilizers and alumina ($Al_2O_3$) as a base. This base is used to increase the heat stability of the copper catalyst and thus extend the lifetime of the catalyst.

In preferred embodiments of the invention, this reaction is carried out at a temperature varying between 175-300° C., preferably being carried out at 200° C. The lower operating temperature is limited by the dew point of the gas fed to the reactor and the upper temperature by the sensitivity of the copper catalyst to thermal deactivation. In these conditions, the space velocity varies between 7,000 and 9,000 h-1, the preferred value being 8,000 $h^{-1}$.

Reactions a, b and c are preferably carried out in adiabatic fixed bed reactors.

In particular embodiments of this process, the gas obtained in step (c) can be subjected to a water elimination step. The gas thus obtained can optionally be sent to a purification unit to obtain hydrogen that is suitable for the degree of purity required in subsequent processes.

Another aspect of the present invention relates to a hydrogen production plant for carrying out this process, comprising (a) a first adiabatic fixed bed reactor in which the natural gas is reacted with a mixture of air and steam to obtain a gas comprising hydrogen and carbon monoxide, (b) a second adiabatic fixed bed reactor in which the carbon monoxide produced in the first reactor is reacted at a high temperature with steam to obtain a gas comprising hydrogen and carbon dioxide, and (c) a third adiabatic fixed bed reactor in which the monoxide which has not reacted in the second reactor is reacted at a low temperature with steam to obtain a gas comprising hydrogen and carbon dioxide.

The objective of the plant is aimed at generating a suitable hydrogen production for companies with intermediate consumption, which do not have a very great need for hydrogen but which is sufficiently important so that the dependence on an industrial gas supplier is less profitable than having their own production system, providing an alternative solution to the problem of not having a hydrogen distribution center close to them.

Description of a Particular Embodiment of the Plant
(FIG. 2)

In the hydrogen production plant of the invention, natural gas (NG) is directly fed from the supply network, therefore it is considered that the $H_2S$ content is minimal, nevertheless, desulfurizing cartridges (DC) are placed to adsorb the small amount of sulfur that the stream may contain (DESULFURIZATION). The saturation thereof will be regulated by means of the pressure drop in the bed, controlled through a differential pressure transmission indicator (DPI). A system of valves will allow changing the line and restoring the inactive bed.

The atmospheric air is compressed to the operating pressure, The compressor system includes the compressor (C), with suction filters, a compressed air tank, an air treatment system (filters and drying equipment) (AIR TREATMENT). A line sending the air to an adsorption dryer is provided for driving the process air compressor. This line consists of a unit formed by two drying towers in a single body and containing a specific moisture adsorbing product. Its regeneration is automatic every two minutes.

The liquid water stream coming from the supply network passes to the steam generating system (SGS). This system can include different elements: pressure unit (outlet at 15 atm), water demineralizer unit, gas/water economizer, gas/steam recuperator, gas/steam superheater (EXCHANGER II), backup electric resistance (providing the necessary energy that the use of process streams cannot provide).

The wet catalytic partial oxidation (WCPO) reactor is an adiabatic fixed bed reactor and is provided with electric resistance for starting operations, duly insulated, outlet temperature control (TIC), inlet pressure indicator (PI) and differential pressure indicator (DPI) between the inlet and the outlet.

The high and low temperature shift reactors (SHIFT 1 and 2) are adiabatic fixed bed reactors and are duly insulated, provided with outlet temperature control (TIC), inlet pressure indicator (PI) and differential pressure indicator (DPI) between the inlet and the outlet.

The temperature of the outlet stream (9) of the WCPO reactor is used to heat the mixture of gases of NG-AIR-Steam through a gas-gas heat exchanger (EXCHANGER IV). The temperature of the outlet stream (8) (inlet to the WCPO reactor) is regulated by means of a by-pass.

A gas-water exchanger (EXCHANGER III) is used to preheat the water stream and cool the gas stream (10) going to reactor SHIFT 1. In the same way, an air cooler (EXCHANGER I) is used to cool the gas stream (13) going to the reactor SHIFT II.

The stream resulting from the low temperature shift reaction is subjected to a condensation through a gas-liquid separator (GLS), the purpose of which is to eliminate virtually all the water from the final stream.

The use of a gas analyzer further allows controlling the $H_2$, CO and $CO_2$ levels produced in the autothermal reformer.

The use of gas detectors to detect possible leaks in the plant and actuate alarms is also contemplated.

Finally, the existence of a torch (T) allows burning process gases when they are not used in the subsequent application, or during the starting and shutting down operations.

To facilitate the transport and installation of the "in situ" production plant object of the invention, the assembly thereof on a skid is contemplated, which skid consists of a metal structure of a suitable size to be loaded in a truck transporting the assembled plant to the place of use, such that it is only necessary to connect the gas, water, electricity and communications network, in addition to the destination of the gas produced.

The following example illustrates the present invention, but must not be considered as a limitation to the essential aspects of the object thereof, as they have been set forth in the previous sections of this description.

Example 1

Plant for the Production of 1000 $Nm^3$/day of Hydrogen from Natural Gas of National Network

TABLE 1

Starting technical specifications.

| Types of Process | Wet CPO |
| --- | --- |
| Size: | Production of 1000 $Nm^3$/day of $H_2$ |
| $H_2$ purification unit | No |
| Feed | Natural gas, air, steam |
| Feed ratios: | $O_2/CH_4 = 0.5$ |
| | $H_2O/CH_4 = 2$ |
| No. of reactors. | 3 |

| Unit | Reactions | Type | Operating Conditions |
| --- | --- | --- | --- |
| Autothermal Reactor (ATR) | $CH_4 + 0.5 O_2 =$ $CO + 2 H_2$ $r_1$ $CH_4 + H_2O =$ $CO + 3 H_2$ $r_2$ $CO + 0.5 O_2 =$ $CO_2$ $r_3$ | Adiabatic Fixed bed. | Pressure: 4 atm. Outlet temperature: 800° C. Space velocity: 80000 $h^{-1}$ |
| High temperature shift reactor (SHIFT 1) | $CO + H_2O =$ $CO_2 + H_2$ $r_4$, | Adiabatic Fixed bed. | Pressure: 4 atm. Outlet temperature: 400° C. Space velocity: 8000 $h^{-1}$ |
| Low temperature shift reactor (SHIFT 2) | $CO + H_2O =$ $CO_2 + H_2$ $r_5$ | Adiabatic Fixed bed. | Pressure: 4 atm. Outlet temperature: 200° C. Space velocity: 8000 $h^{-1}$ |

The plant size corresponds to an (unpurified) hydrogen production of 1000 $Nm^3$/day, which amount is considered sufficient so that the installation of the system can be profitable compared to the supply by means of special trucks by an industrial gas company, and which has been adopted as the basis for calculating the sizing of the system.

The volumetric composition of the starting natural gas feed stream (assuming that all the hydrocarbons are methane) is as follows:

TABLE 2

Volumetric composition of NG feed

| Compound | % by volume |
| --- | --- |
| $CH_4$ (total hydrocarbons) | 96.79 |
| Nitrogen ($N_2$) | 3.06 |
| Carbon dioxide ($CO_2$) | 0.15 |

The volumetric composition of the atmospheric air and the adopted atmospheric conditions are as follows:

TABLE 3

Volumetric composition of the atmospheric air and adopted atmospheric conditions

| Volumetric Composition | $O_2$ | 21% |
| --- | --- | --- |
| | $N_2$ | 79% |
| Atmospheric Conditions | Pressure | 1 atm |
| | Temperature | 15° C. |

With the operation specifications established in the previous sections, the mass balance is carried out (see Table 4) on the basis of 100 mol/h of $CH_4$ fed.

TABLE 4

Parameters of interest extracted from the mass balance

| Reactor | Parameter of interest | |
| --- | --- | --- |
| WetCPO | $CH_4$ conversion: | 89.1% |
| | $O_2$ conversion: | 90.0% |
| | Molar $H_2/CH_4$ ratio: | 2.15 |
| | $H_2$/CO Mol: | 4.15 |
| | $H_2$ selectivity: | 56.8% |
| | CO selectivity: | 57.9% |
| SHIFT 1 | Molar $H_2O$/CO ratio fed | 3.2 |
| | CO conversion (equilibrium) | 94.6% |
| | $H_2/CH_4$ ratio: | 2.64 |
| | $H_2$/CO ratio: | 93.71 |
| | $H_2$ selectivity: | 69.7% |
| | CO selectivity: | 3.15% |
| SHIFT 2 | CO conversion (equilibrium) | 99.3% |
| | $H_2/CH_4$: | 2.66 |
| | $H_2$/CO: | 13880.9 |
| | $H_2$ selectivity: | 70.4% |
| | CO selectivity: | 0.02% |
| End Product | $H_2$ 47.3 molar % (dry base) | 41.67 $Nm^3$/h |
| | $N_2$ 34.0 molar % (dry base) | 29.90 $Nm^3$/h |
| | $CO_2$ 15.9 molar % (dry base) | 13.96 $Nm^3$/h |

Thermal efficiency of the process: 75.9%

Finally, the scale ratio is established to obtain the desired H₂ production, which allows defining the flows of each of the streams. The ASPEN PLUS simulation program, which allows establishing the final plant configuration, is used to achieve the best energy use of the system. The compositions, flows, temperatures and other parameters of interest are shown in Table 5.

TABLE 5

Flows, compositions and characteristics of the different streams of the $H_2$ production plant design

|  | 1 | 2 | 3 | 4 | 5 | 6 | 7 | 8 | 9 |
|---|---|---|---|---|---|---|---|---|---|
| Molar flow (kmol/h) | | | | | | | | | |
| $CH_4$ | 0.698 | 0.000 | 0.000 | 0.698 | 0.673 | 0.024 | 0.673 | 0.698 | 0.076 |
| $O_2$ | 0.349 | 0.000 | 0.000 | 0.349 | 0.337 | 0.012 | 0.337 | 0.349 | 0.035 |
| $N_2$ | 1.335 | 0.000 | 0.000 | 1.335 | 1.288 | 0.047 | 1.288 | 1.335 | 1.335 |
| $H_2O$ | 0.000 | 1.396 | 1.396 | 1.396 | 1.347 | 0.049 | 1.347 | 1.396 | 1.141 |
| $H_2$ | 0.000 | 0.000 | 0.000 | 0.000 | 0.000 | 0.000 | 0.000 | 0.000 | 1.499 |
| CO | 0.000 | 0.000 | 0.000 | 0.000 | 0.000 | 0.000 | 0.000 | 0.000 | 0.361 |
| $CO_2$ | 0.001 | 0.000 | 0.000 | 0.001 | 0.001 | 0.000 | 0.001 | 0.001 | 0.262 |
| Molar fraction | | | | | | | | | |
| $CH_4$ | 0.29 | 0.00 | 0.00 | 0.18 | 0.18 | 0.18 | 0.18 | 0.18 | 0.02 |
| $O_2$ | 0.15 | 0.00 | 0.00 | 0.09 | 0.09 | 0.09 | 0.09 | 0.09 | 0.01 |
| $N_2$ | 0.56 | 0.00 | 0.00 | 0.35 | 0.35 | 0.35 | 0.35 | 0.35 | 0.28 |
| $H_2O$ | 0.00 | 1.00 | 1.00 | 0.37 | 0.37 | 0.37 | 0.37 | 0.37 | 0.24 |
| $H_2$ | 0.00 | 0.00 | 0.00 | 0.00 | 0.00 | 0.00 | 0.00 | 0.00 | 0.32 |
| CO | 0.00 | 0.00 | 0.00 | 0.00 | 0.00 | 0.00 | 0.00 | 0.00 | 0.08 |
| $CO_2$ | 0.00 | 0.00 | 0.00 | 0.00 | 0.00 | 0.00 | 0.00 | 0.00 | 0.06 |
| Molar flow (kmol/h) | 2.383 | 1.396 | 1.396 | 3.779 | 3.647 | 0.132 | 3.647 | 3.779 | 4.709 |
| Temperature (° C.) | 15 | 324 | 314 | 132 | 132 | 132 | 668 | 651 | 800 |
| Pressure (atm) | 4 | 15 | 4 | 4 | 4 | 4 | 4 | 4 | 4 |
| Vapor fraction | 1 | 1 | 1 | 1 | 1 | 1 | 1 | 1 | 1 |
| Liquid fraction | 0 | 0 | 0 | 0 | 0 | 0 | 0 | 0 | 0 |
| Enthalpy (kCal/mol) | −5.34 | −55.40 | −55.40 | −23.83 | −23.83 | −23.83 | −18.95 | −19.12 | −15.35 |
| Enthalpy (kW) | −14.8 | −89.9 | −89.9 | −104.7 | −101.1 | −3.67 | −80.38 | −84.05 | −84.05 |
| Entropy (J/kg K) | −1121 | −2404 | −1806 | −989 | −989 | −989 | 415 | 381 | 2122 |
| Molar density (kmol/m³) | 0.168 | 0.313 | 0.083 | 0.119 | 0.119 | 0.119 | 0.051 | 0.052 | 0.045 |
| Density (kg/m³) | 4.209 | 5.632 | 1.491 | 2.686 | 2.686 | 2.686 | 1.149 | 1.170 | 0.808 |
| Ave. molecular weight | 25.10 | 18.02 | 18.02 | 22.48 | 22.48 | 22.48 | 22.48 | 22.48 | 18.04 |

|  | 10 | 11 | 12 | 13 | 14 | 15 | 16 | WATER |
|---|---|---|---|---|---|---|---|---|
| Molar flow (kmol/h) | | | | | | | | |
| $CH_4$ | 0.076 | 0.076 | 0.076 | 0.076 | 0.076 | 0.076 | 0.076 | 0.000 |
| $O_2$ | 0.035 | 0.035 | 0.035 | 0.035 | 0.035 | 0.035 | 0.035 | 0.000 |
| $N_2$ | 1.335 | 1.335 | 1.335 | 1.335 | 1.335 | 1.335 | 1.335 | 0.000 |
| $H_2O$ | 1.141 | 1.141 | 0.800 | 0.800 | 0.800 | 0.780 | 0.780 | 1.396 |
| $H_2$ | 1.499 | 1.499 | 1.841 | 1.841 | 1.841 | 1.860 | 1.860 | 0.000 |
| CO | 0.361 | 0.361 | 0.020 | 0.020 | 0.020 | 0.000 | 0.000 | 0.000 |
| $CO_2$ | 0.262 | 0.262 | 0.604 | 0.604 | 0.604 | 0.623 | 0.623 | 0.000 |
| Molar fraction | | | | | | | | |
| $CH_4$ | 0.02 | 0.02 | 0.02 | 0.02 | 0.02 | 0.02 | 0.02 | 0.00 |
| $O_2$ | 0.01 | 0.01 | 0.01 | 0.01 | 0.01 | 0.01 | 0.01 | 0.00 |
| $N_2$ | 0.28 | 0.28 | 0.28 | 0.28 | 0.28 | 0.28 | 0.28 | 0.00 |
| $H_2O$ | 0.24 | 0.24 | 0.17 | 0.17 | 0.17 | 0.17 | 0.17 | 1.00 |
| $H_2$ | 0.32 | 0.32 | 0.39 | 0.39 | 0.39 | 0.40 | 0.40 | 0.00 |
| CO | 0.08 | 0.08 | 0.00 | 0.00 | 0.00 | 0.00 | 0.00 | 0.00 |
| $CO_2$ | 0.06 | 0.06 | 0.13 | 0.13 | 0.13 | 0.13 | 0.13 | 0.00 |
| Molar flow (kmol/h) | 4.709 | 4.709 | 4.709 | 4.709 | 4.709 | 4.709 | 4.709 | 1.396 |
| Temperature (° C.) | 344 | 316 | 400 | 198 | 195 | 200 | 60 | 15 |
| Pressure (atm) | 4 | 4 | 4 | 4 | 4 | 4 | 4 | 15 |
| Vapor fraction | 1 | 1 | 1 | 1 | 1 | 1 | 0.87 | 0 |
| Liquid fraction | 0 | 0 | 0 | 0 | 0 | 0 | 0.13 | 1 |
| Enthalpy (kCal/mol) | −19.12 | −19.34 | −19.34 | −20.94 | −20.97 | −20.97 | −23.37 | −68.91 |
| Enthalpy (kW) | −104.7 | −105.9 | −105.9 | −114.7 | −114.8 | −114.8 | −128.0 | −111.9 |
| Entropy (J/kg K) | 1063 | 980 | 1028 | 371 | 360 | 360 | −1143 | −9475 |
| Molar density (kmol/m³) | 0.078 | 0.082 | 0.071 | 0.102 | 0.103 | 0.102 | 0.165 | 55.681 |
| Density (kg/m³) | 1.407 | 1.473 | 1.289 | 1.843 | 1.855 | 1.834 | 2.984 | 1003 |
| Ave. molecular weight | 18.04 | 18.04 | 18.04 | 18.04 | 18.04 | 18.04 | 18.04 | 18.02 |

|  | AIR | NG | XWATER | XPROD |
|---|---|---|---|---|
| Molar flow (kmol/h) | | | | |
| $CH_4$ | 0.000 | 0.698 | 0.000 | 0.076 |
| $O_2$ | 0.349 | 0.000 | 0.000 | 0.035 |

TABLE 5-continued

Flows, compositions and characteristics of the different streams of the $H_2$ production plant design

|  | | | | |
|---|---|---|---|---|
| $N_2$ | 1.313 | 0.022 | 0.000 | 1.335 |
| $H_2O$ | 0.000 | 0.000 | 0.705 | 0.075 |
| $H_2$ | 0.000 | 0.000 | 0.000 | 1.860 |
| CO | 0.000 | 0.000 | 0.000 | 0.000 |
| $CO_2$ | 0.000 | 0.001 | 0.000 | 0.623 |
| Molar fraction | | | | |
| $CH_4$ | 0.00 | 0.97 | 0.00 | 0.02 |
| $O_2$ | 0.21 | 0.00 | 0.00 | 0.01 |
| $N_2$ | 0.79 | 0.03 | 0.00 | 0.33 |
| $H_2O$ | 0.00 | 0.00 | 1.00 | 0.02 |
| $H_2$ | 0.00 | 0.00 | 0.00 | 0.46 |
| CO | 0.00 | 0.00 | 0.00 | 0.00 |
| $CO_2$ | 0.00 | 0.00 | 0.00 | 0.16 |
| Molar flow (kmol/h) | 1.662 | 0.721 | 0.705 | 4.005 |
| Temperature (° C.) | 15 | 15 | 40 | 40 |
| Pressure (atm) | 4 | 4 | 4 | 4 |
| Vapor fraction | 1 | 1 | 0 | 1 |
| Liquid fraction | 0 | 0 | 1 | 0 |
| Enthalpy (kCal/mol) | −0.08 | −17.47 | −68.00 | −15.95 |
| Enthalpy (kW) | −0.15 | −14.65 | −55.71 | −74.26 |
| Entropy (J/kg K) | −285 | −5445 | −8851 | −104 |
| Molar density ($kmol/m^3$) | 0.167 | 0.169 | 55.088 | 0.154 |
| Density ($kg/m^3$) | 4.829 | 2.773 | 992.4 | 2.774 |
| Ave. molecular weight | 28.85 | 16.45 | 18.02 | 18.05 |

Material: The areas of the plant subjected to temperatures of less than 450° C. are built from 304 L stainless steel, whereas 316 stainless steel is used in those which are subjected to higher temperatures.

Reactors: They are tubular fixed bed type reactors (see technical specifications in Tables 6, 7 and 8).

TABLE 6

Technical specifications of the ATR reactor.

| | |
|---|---|
| Space velocity: | 80,000 $h^{-1}$ |
| Inflow: | Temperature: 651° C. Volumetric flow: 84.65 $Nm^3/h$ |
| Outflow: | Temperature: 800° C. Volumetric flow: 105.49 $Nm^3/h$ |
| Catalyst: | Type: Commercial |
| | Reference: CRG-FL ICI katalco |
| | Composition: 75-81% of NiO |
| | Raw density: 1.30-1.45 kg/l |
| | Particle size: diameter of 5.4 mm × length of 3.6 mm. |
| Reactor dimensions: | Nominal diameter: 3½" Length: 270 mm |
| Catalytic bed volume: | 1060 $cm^3$ |

TABLE 7

Technical specifications of reactor SHIFT 1

| | |
|---|---|
| Space velocity: | 8000 $h^{-1}$ |
| Inflow[7]: | Temperature: 360° C. Volumetric flow: 105.49 $Nm^3/h$ |
| Outflow[7]: | Temperature: 400° C. Volumetric flow: 105.49 $Nm^3/h$ |
| Catalyst: | Type: Commercial |
| | Reference: 71-5 ICI katalco |
| | Composition (by weight) 88% $Fe_2O_3$; 9% $Cr_2O_3$; 2.6% CuO |
| | Raw density: 1.25 kg/l |
| | Shape: Pellets |
| | Particle size: diameter of 8.5 mm × length of 4.9 mm. |
| Catalytic bed volume: | 10,000 $cm^3$ |
| Reactor dimensions: | Nominal diameter: 5" Length: 1100 mm |

TABLE 8

Technical specifications of reactor SHIFT 2

| | |
|---|---|
| Space velocity: | 8000 $h^{-1}$ |
| Inflow: | Temperature: 198° C. Volumetric flow: 105.49 $Nm^3/h$ |
| Outflow: | Temperature: 200° C. Volumetric flow: 105.49 $Nm^3/h$ |
| Catalyst: | Type: Commercial |
| | Reference: 83-3L Katalco |
| | Composition (% weight): 51% CuO; 31% ZnO; rest $Al_2O_3$ |
| | Raw density: 1.33 kg/l |
| | Shape: Pellets |
| | Particle size: diameter of 8.2 mm × 5.6 mm of length. |
| Catalytic bed volume: | 11 000 $cm^3$ |
| Reactor dimensions: | Nominal diameter: 5" Length: 1200 mm |

At the outlet of the low temperature converter, the synthesis gas contains, by volume, 39.5% of $H_2$, 28.4% of $N_2$, 13.2% of $CO_2$, 16.6% of $H_2O$, 1.6% of $CH_4$ and 0.7% of $O_2$.

The obtained gas is condensed by a gas-liquid separator. Table 9 shows the composition and flows of the product gas once the water content has been eliminated.

TABLE 9

Dry base composition and volumetric flow in normal conditions of the product stream.

| Compound | Molar % | Molar flow $Nm^3/h$ |
|---|---|---|
| $CH_4$ | 1.9 | 1.701 |
| $O_2$ | 0.9 | 0.782 |
| $N_2$ | 34.0 | 29.9049 |
| $H_2$ | 47.3 | 41.665 |
| CO | 0.0 | 0.003 |
| $CO_2$ | 15.9 | 13.956 |
| total | 100 | 88.012 |

LITERATURE

1.—Andrew E. et al., Int. J. Hydrog. Technology, 28 (2002) 159.
2.—Andrew E. et al., Int. J. Hydrog. Technology, 29 (2004) 809.
3.—Arias E., P. L. "*La oxidación catalítica de gas natural. Una nueva tecnología para la fabricación descentralizada de hidrógend*". Cuaderno para la Innovación tecnológica, 15. Fundación BABCOCK. 2001.
4.—Avci, A. K., Trimm, D. L., Ilsen Önsan, Z., *Chem. Eng. Science* 56 (2001), 641.
5.—BOE (Official State Journal) no. 42 of Feb. 18, 2002. Order ECO/302/2002. p. 6377
6.—Cavallaro, S., Freni, S., *J. Power Sources* 76 (1998), 190.
7.—*"Steam Hydrocarbon Reforming Catalysts"* Catalog, CCE Technical Bulletin, Süd-Chemie AG.
8.—Catalogue "*Steam Reforming Catalysts, Natural Gas, Associated Gas and LPG*" ICI Katalco.
9.—Personal communication of PRAXAIR Europe, Madrid.
10.—Choudhary V. R., Uphade B. S. and Mamman A. S. *J. of Catal.*, 172 (1997) 281.
11.—De Groote, A. M. and Froment, G. F. *Appl. Catal.* 138 (1996), 245.
12.—Freni, S., Calogero, G. Cavallaro, S., *J. Power Sources* 87 (2000) 28.
13.—Report of research project OD2000UN55 (Basque Government, Industry Department), August (2000).
14.—Six-monthly report of research project OD2000UN55 (Basque Government, Industry Department), September (2000).
15.—Hohn, K. L., Schmidt, L. D., *Appl. Catal.* 211 (2001), 53.
16.—Hord, J., Int. *J. of Hydrogen Energy,* 3 (1978), 157.
17.—Maiya, P. S., Anderson, T. J., Mieville, R. L., Dusek, J. T., Picciolo, J. J., Balachandran, U., *Appl. Catal. A.* 196, (2000), 65.
18.—Myers, D. B., Ariff, G. D., James B. D., Lettow, J. S., Thomas, C. E., Kuhn, R. T., "*Cost and Performance Comparison of Stationary Hydrogen Fueling Appliances*" Task 2 Report. (2002). The Hydrogen Program Office, U.S. Department of Energy. Washington. April.
19.—NASA: National Aeronautics and Space Administration "*Safety Standard for Hydrogen Systems, Guidelines for hydrogen systems design, materials selection, operations storage and transportation*" (1997) Office of Safety and Mission Assurance, Washington, D.C. 20546.
20.—Ogden, J. M. "*Review of Small Stationary Reformers for Hydrogen Production" Report to the International Energy Agency,* (2001). Center for Energy and Environmental Studies. Univ. Princeton.
21.—Parkinson G. *Chem. Eng.,* 107 (2000), 8.
22.—Peña, M. A., Gómez, J. P., Fierro, J. L. G., *Appl. Catal.* 144 (1998), 191.
23.—Rabe, S.; Truong T. B. and Vogel F. Applied Catalysis A: General. Pending publication)
24.—Recupero, V., Pino, L., Di Leonardo, R., Lagana, M., Maggio, G., *J. Power Sources,* 71 (1998), 208.
25.—Ruckenstein E. and Hu Y. H. *Ind. Eng. Chem. Res.* 37 (1998) 1744.
26.—Stitt, E. H., Abbott, P., Cromarty, B. J., Crewdson "Emerging Trends in Syngas and Hydrogen" CatCon 2000, SYNETIX and KATALCO, ICI Group of Companies
27.—Tsipouriari V. A., Zhang Z. and Verykios X. E. J. of Catal., 179 (1998) 283.
28.—Tsipouriari V. A. and Verykios X. E. J. of Catal., 179 (1998) 292.
29.—Viñas, J., Barreto, G. F., González, M. G., Laborde, M. A., Moreno, N. E. *Latin Am. Appl. Res.,* 2: 29 (1999), 91.
30.—Wolf, D., Höhenberger, Baerns, M., *Ind. Eng. Chem. Res.* 36 (1997), 3345.
31.—Yamaguchi T. *Catalysis Today,* 20 (1994) 199.
32.—Zhu, J. Zhang, D., King, K. D. *Fuel* 80 (2001), 899.

What is claimed is:

1. A process for obtaining hydrogen from natural gas, the process comprising the steps of:
  a. reacting the natural gas with a mixture of air and steam in a single reactor to obtain a gas comprising hydrogen and carbon monoxide,
  b. reacting the carbon monoxide produced in step (a) at a high temperature with steam to obtain a gas comprising hydrogen and carbon dioxide, and
  c. reacting the carbon monoxide which has not reacted in step (b) at a low temperature with steam to obtain a gas comprising hydrogen and carbon dioxide,
wherein in step (a) the natural gas, the air and the steam are fed simultaneously with an $O_2/CH_4$ feed ratio varying between 0.4 and 0.7 and a $H_2O/CH_4$ feed ratio varying between 0.8 and 2.5 and react on the same catalyst at a space velocity comprised between 70,000 and 90,000 $h^{-1}$, and in that the pressure used in steps (a) to (c) varies between 1 and 8 atm.

2. A process for obtaining hydrogen from natural gas according to claim 1, comprising an $O_2/CH_4$ feed ratio of 0.5 and a $H_2O/CH_4$ feed ratio of 2.

3. A process for obtaining hydrogen from natural gas according to claim 1, wherein the pressure used in steps (a) to (c) is 4 atm.

4. A process for obtaining hydrogen from natural gas according to claim 1, wherein step (a) is carried out at a temperature varying between 500 and 1000° C.

5. A process for obtaining hydrogen from natural gas according to claim 4, wherein step (a) is carried out at a temperature of 800° C.

6. A process for obtaining hydrogen from natural gas according to claim 1, wherein step (b) is carried out at a temperature varying between 350 and 450° C.

7. A process for obtaining hydrogen from natural gas according to claim 6, wherein step (b) is carried out at a temperature of 400° C.

8. A process for obtaining hydrogen from natural gas according to claim 1, wherein step (c) is carried out at a temperature varying between 175 and 300° C.

9. A process for obtaining hydrogen from natural gas according to claim 8, wherein step (c) is carried out at a temperature of 200° C.

10. A process for obtaining hydrogen from natural gas according to claim 1, wherein the feed natural gas is subjected to a prior sulfur compound elimination step.

11. A process for obtaining hydrogen from natural gas according to claim 1, wherein the excess heat from step (a) is used to preheat the entire feed to the reactor and in that excess heat from steps (b) and (c) is used to produce the steam used.

12. A process for obtaining hydrogen from natural gas according to claim 1, wherein the gas obtained in step (c) is subjected to a water elimination step.

13. A process for obtaining hydrogen from natural gas according to claim 12, wherein the water-free gas is subjected to a subsequent purification stage.

14. A process for obtaining hydrogen from natural gas according to claim 1, wherein steps (b) and (c) take place in two different reactors.

15. A process for obtaining hydrogen from natural gas according to claim 1, wherein the reactors used are adiabatic fixed bed type reactors.

16. A process for obtaining hydrogen from natural gas according to claim 1, wherein the space velocity of steps (a) is $80,000\ h^{-1}$.

17. A process for obtaining hydrogen from natural gas according to claim 1, wherein the space velocity of steps (b) and (c) varies between 7,000 and $9,000\ h^{-1}$.

18. A process for obtaining hydrogen from natural gas according to claim 17, wherein the space velocity of steps (b) and (c) is $8,000\ h^{-1}$.

* * * * *